United States Patent
Rivers, Jr.

(10) Patent No.: US 8,526,151 B2
(45) Date of Patent: Sep. 3, 2013

(54) SHARED MEMORY ARCHITECTURE FOR PROTECTION OF ELECTRICAL DISTRIBUTION EQUIPMENT

(75) Inventor: Cecil Rivers, Jr., West Hartford, CT (US)

(73) Assignee: General Electric Company, Schenectady, NY (US)

( * ) Notice: Subject to any disclaimer, the term of this patent is extended or adjusted under 35 U.S.C. 154(b) by 309 days.

(21) Appl. No.: 12/945,137

(22) Filed: Nov. 12, 2010

(65) Prior Publication Data

US 2012/0120536 A1 May 17, 2012

(51) Int. Cl.
*H02H 3/00* (2006.01)

(52) U.S. Cl.
USPC .............................................. 361/62; 361/64

(58) Field of Classification Search
USPC ..................... 361/64, 62; 700/292
See application file for complete search history.

(56) References Cited

U.S. PATENT DOCUMENTS

| | | | | |
|---|---|---|---|---|
| 4,556,882 A * | 12/1985 | Brifman et al. | ............. | 340/3.44 |
| 5,426,592 A * | 6/1995 | Leone et al. | ................. | 700/292 |
| 5,943,201 A * | 8/1999 | Walker et al. | .................. | 361/64 |
| 6,005,757 A * | 12/1999 | Shvach et al. | .................. | 361/64 |
| 6,105,119 A | 8/2000 | Kerr et al. | | |
| 6,167,329 A * | 12/2000 | Engel et al. | ................. | 361/93.2 |
| 6,179,489 B1 | 1/2001 | So et al. | | |
| 6,615,376 B1 * | 9/2003 | Olin et al. | ...................... | 714/57 |

\* cited by examiner

*Primary Examiner* — Rexford Barnie
*Assistant Examiner* — Joseph Inge
(74) *Attorney, Agent, or Firm* — Global Patent Operation (57) ABSTRACT

A power equipment protection system includes a plurality of trip units including at least a first trip unit and a second trip unit, wherein each of the plurality of trip units is configured to monitor operation data. The system also includes a shared memory device coupled to the plurality of trip units via a network, wherein the shared memory device is configured to transmit a synchronization request to at least the second trip unit, receive a response from the second trip unit, including operation data associated with the second trip unit, receive a data request from the first trip unit, and transmit the operation data associated with the second trip unit to the first trip unit via the network.

20 Claims, 5 Drawing Sheets

SHARED MEMORY ARCHITECTURE FOR PROTECTION OF ELECTRICAL DISTRIBUTION EQUIPMENT

BACKGROUND OF THE INVENTION

The embodiments described herein relate generally to power equipment protection systems and, more particularly, to shared memory architecture for use with power equipment protection systems.

At least some known protection systems for electrical distribution equipment include one or more trip units and/or one or more circuit breakers. Such devices monitor and/or measure aspects of a circuit, and interrupt the circuit based on these aspects. Moreover, at least some known protection systems use protection algorithms that analyze data from multiple circuits by directly connecting the trip units and/or circuit breakers. However, direct connections generally require additional hardware, such as signal repeaters and/or signal splitters, to enable a first trip unit, for example, to transmit data to the remaining trip units within the system. Accordingly, directly connecting trip units in order to share data generally increases the complexity of installation, configuration, and/or maintenance of such known systems.

BRIEF DESCRIPTION OF THE INVENTION

In one aspect, a method includes receiving a data request from a first trip unit of a plurality of trip units by a shared memory device that includes a memory area, wherein each trip unit is configured to collect operation data relating to a respective circuit breaker, and wherein the shared memory device includes a memory area. The method also includes locating operation data associated with a second trip unit of the plurality of trip units in the memory area, and transmitting the operation data associated with the second trip unit to the first trip unit for use in a multi-point function performed by the first trip unit.

In another aspect, a power equipment protection system includes a plurality of trip units including at least a first trip unit and a second trip unit, wherein each of the plurality of trip units is configured to monitor operation data. The system also includes a shared memory device coupled to the plurality of trip units via a network, wherein the shared memory device is configured to transmit a synchronization request to at least the second trip unit, receive a response from the second trip unit, including operation data associated with the second trip unit, receive a data request from the first trip unit, and transmit the operation data associated with the second trip unit to the first trip unit via the network.

In another aspect, a shared memory device includes a memory area configured to store operation data associated with at least a first trip unit of a plurality of trip units, and a processor coupled to the memory area. The processor is configured to receive operation data from the first trip unit via a network, store the operation data in the memory area, and transmit the operation data via the network to a second trip unit of the plurality of trip units.

DETAILED DESCRIPTION OF THE INVENTION

Exemplary embodiments of systems, methods, and apparatus for use in a shared memory architecture of a power equipment protection system are described herein. These embodiments enable a plurality of trip units to obtain operation data for use in multi-point protection algorithms from a single shared memory device. Using a single shared memory device enables the use of multi-point protection algorithms without requiring network or other communication connections between each trip unit. Rather, each trip unit communicates with the shared memory device to store circuit breaker operation data and to retrieve circuit breaker operation data. A simplified network architecture facilitates easier installation, installation of fewer system components, and/or easier configuration of the system. Moreover, a simplified network architecture enables a standardized system to be used.

Figure 1:
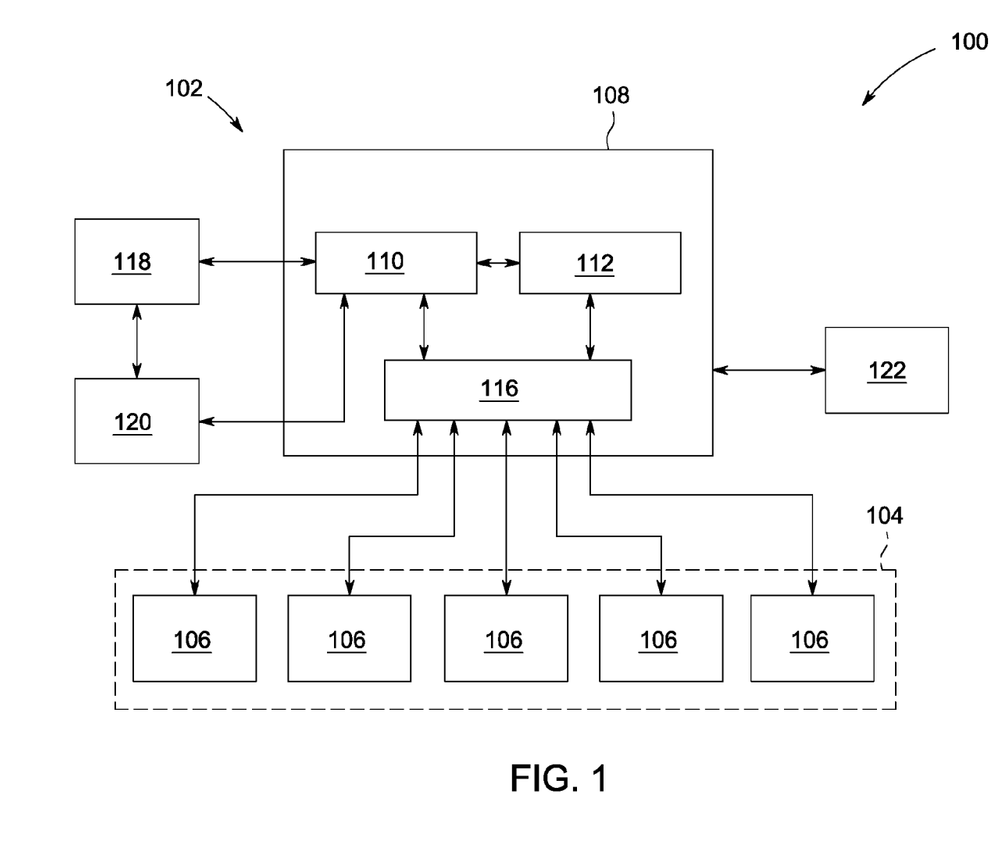
FIG. 1 is a schematic block diagram of an exemplary power system that includes an equipment protection system and a distribution system.

FIG. 1 is a schematic block diagram of an exemplary power system 100 that includes an equipment protection system 102 and a distribution system 104. In the exemplary embodiment, distribution system 104 includes a plurality of switchgear units 106. Protection system 102 includes a central controller 108 that includes a processor 110 and a memory area 112 coupled to processor 110. Processor 110 controls and/or monitors operation of switchgear units 106. More specifically, processor 110 controls and/or monitors operation of a plurality of circuit breakers and trip units (neither shown in FIG. 1) within switchgear units 106. Processor 110 communicates with switchgear units 106 via a network 114. For example, central controller 108 includes a central communication unit 116 that enables transmitting and receiving data and/or commands between processor 110 and switchgear units 106 via network 114.

It should be understood that the term "processor" refers generally to any programmable system including systems and microcontrollers, reduced instruction set circuits (RISC), application specific integrated circuits (ASIC), programmable logic circuits, and any other circuit or processor capable of executing the functions described herein. The above examples are exemplary only, and thus are not intended to limit in any way the definition and/or meaning of the term "processor."

Moreover, memory area 112 stores program code and instructions, executable by processor 110, to control and/or monitor switchgear units 106. Memory area 112 may include one, or more than one, forms of memory. For example, memory area 112 can include random access memory (RAM), which can include non-volatile RAM (NVRAM), magnetic RAM (MRAM), ferroelectric RAM (FeRAM) and other forms of memory. Memory area 112 may also include read only memory (ROM), flash memory and/or Electrically Erasable Programmable Read Only Memory (EEPROM). Any other suitable magnetic, optical and/or semiconductor memory, by itself or in combination with other forms of memory, may be included in memory area 112. Memory area 112 may also be, or include, a detachable or removable memory, including, but not limited to, a suitable cartridge, disk, CD ROM, DVD or USB memory.

Moreover, in the exemplary embodiment of FIG. 1, protection system 102 includes a display device 118 and a user input device 120 that provide a user interface for monitoring and controlling distribution system 104 using protection system 102. Display device 118 may include, without limitation, a monitor, a television display, a plasma display, a liquid crystal display (LCD), a display based on light emitting diodes (LED), a display based on a plurality of organic light-emitting diodes (OLEDs), a display based on polymer light-emitting diodes (PLEDs), a display based on a plurality of surface-conduction electron-emitters (SEDs), a display including a projected and/or reflected image or any other suitable electronic device or display mechanism. In one embodiment, display device 118 includes a touch-screen with an associated touch-screen controller. Display device 118 may be of any suitable configuration, such as a square, a rectangle or an elongated rectangle.

Figure 2:
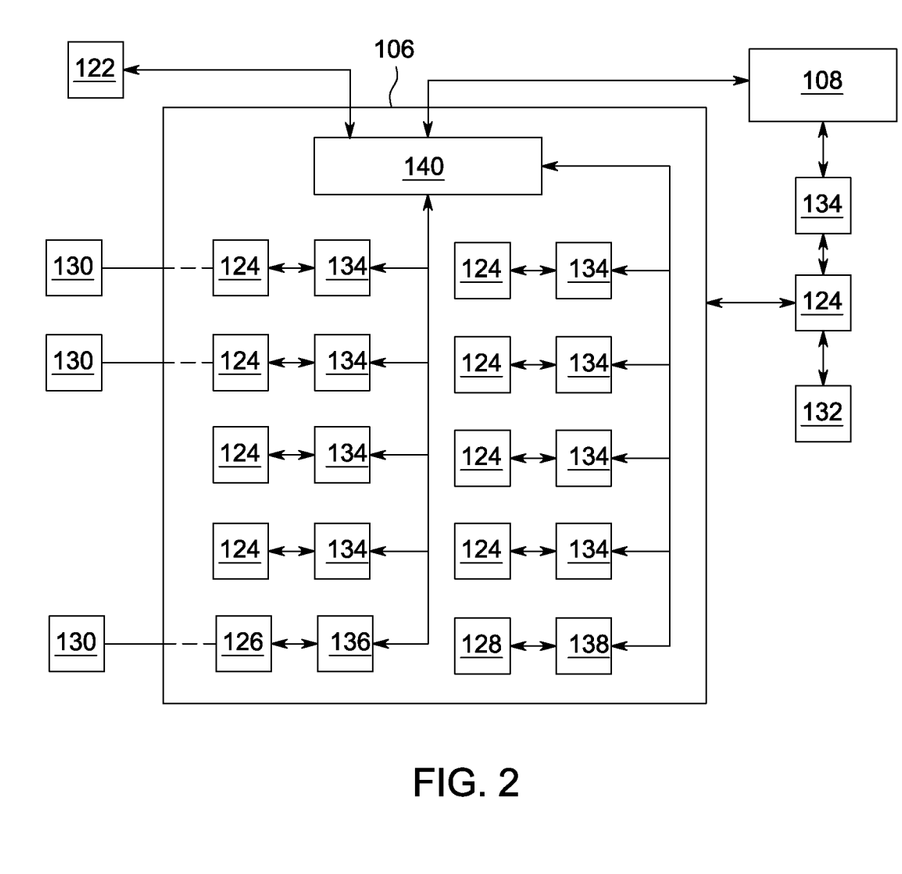
FIG. 2 is a schematic block diagram of the power distribution system shown in FIG. 1.

Furthermore, in the exemplary embodiment of FIG. 1, power system 100 includes one or more shared memory devices 122. In some embodiments, as shown in FIG. 1, power system 100 includes a single shared memory device 122. However, each switchgear unit 106 may also include one or more shared memory devices 122 as shown in FIG. 2 below. As described in greater detail below, shared memory device 122 receives and stores operation data for a plurality of trip units and/or circuit breakers for use in executing multi-point functions by other trip units and/or circuit breakers. For example, a first trip unit collects operation data relating to a first circuit breaker. The first trip unit may gather operation data by measuring a current level through a conductor of a circuit that is monitored by the first circuit breaker, measuring a voltage level across a plurality of conductors of the circuit, and/or detecting or receiving a breaker status of the first circuit breaker. The first trip unit transmits the operation data relating to the first circuit breaker to shared memory device 122, which stores the operation data according to a memory map. When a second trip unit requests operation data relating to the first circuit breaker for use in a multi-point protection algorithm, shared memory device 122 determines a storage location according to the memory map and transmits the operation data to the second trip unit. The second trip unit can then use the operation data to execute the multi-point protection algorithm.

In some embodiments, the term "operation data" relates to any suitable data that can be acquired by a first trip unit from a circuit breaker for use by a second trip unit. Examples of operation data include, but are not limited to only including, a current level through a conductor of a circuit that is monitored by a circuit breaker, a voltage level across a plurality of conductors of a circuit that is monitored by a circuit breaker, and/or a trip status of a circuit breaker. However, any suitable data related to the operational status of a circuit breaker may be included in operation data.

The terms "multi-point function" and "multi-point protection algorithm" refer to a function, or an algorithm having a plurality of functions, that is executed by a trip unit using data, such as operation data, that has been acquired from one or more circuit breakers other than a circuit breaker to which the trip unit is coupled. For example, a first trip unit may acquire operation data from a first circuit breaker, and a second trip unit may acquire operation data from a second circuit breaker. A third trip unit may then analyze the operation data collected by the first trip unit and/or the operation data collected by the second trip unit, using a multi-point function or multi-point protection algorithm, to determine a status of a system as a whole or a portion of a system. The multi-point function or multi-point protection algorithm executed by the third trip unit may also use operation data that is acquired by the third trip unit from a third circuit breaker.

The term "memory map" refers to a memory segment that has been assigned a direct correlation with some device, such as a trip unit. In some embodiments, the memory map is a file that is physically present within the memory device. However, the memory map may also be a separate device, a memory object, or other suitable resource that can be referenced.

FIG. 2 is a schematic block diagram of power distribution system 104. More specifically, FIG. 2 is a schematic block diagram of switchgear unit 106 that includes shared memory device 122. In the exemplary embodiment, switchgear unit 106 also includes a plurality of circuit breakers 124 or other circuit switches or interruptors, including a first circuit breaker 126 and a second circuit breaker 128. Each circuit breaker 124 is removably coupled within switchgear unit 106 and is configured to control power to one or more loads 130. Loads 130 may include, but are not limited to only including, machinery, motors, lighting, and/or other electrical and mechanical equipment of a manufacturing or power generation or distribution facility. Power is provided to switchgear unit 106 from a main power feed 132, which is also coupled to circuit breaker 124. The power is then divided into a plurality of branch circuits using circuit breakers 124 for providing power to loads 130.

Each circuit breaker 124 is communicatively coupled to a trip unit 134. For example, first circuit breaker 126 is coupled to a first trip unit 136, and second circuit breaker 128 is coupled to a second trip unit 138. In the exemplary embodiment, trip units 134 are also communicatively coupled to controller 108 and shared memory device 122. For example, trip units 134 may be directly coupled for communication with controller 108 and shared memory device 122, or may be coupled for communication with controller 108 and shared memory device 122 via a communication unit 140. Moreover, communication between trip units 134, controller 108, and/or shared memory device 122 may be provided via a hardwired communication link or via a wireless communication link. Trip units 134 collect operation data relating to a corresponding circuit breaker 124. For example, first trip unit 136 may gather operation data by obtaining a current level through a conductor of a circuit that is monitored by first circuit breaker 126, a voltage level across a plurality of conductors of the circuit that is monitored by circuit breaker 126, and/or a breaker status of circuit breaker 126. Each trip unit 134 then transmits the operation data to shared memory device 122 via communication unit 140. In some embodiments, trip unit 134 periodically receives the operation data at a preselected frequency. Moreover, in some embodiments, trip unit 130 includes a memory area (not shown) that can store operation data for a certain period of time, such that trip unit 134 can then transmit a batch amount of operation data to shared memory device 122. In the exemplary embodiment, trip units 134 execute stored instructions for a multi-point protection algorithm using operation data related to multiple circuit breakers 124. For example, second trip unit 138 executes one or more multi-point protection algorithms using operation data related to first circuit breaker 126.

Figure 3:
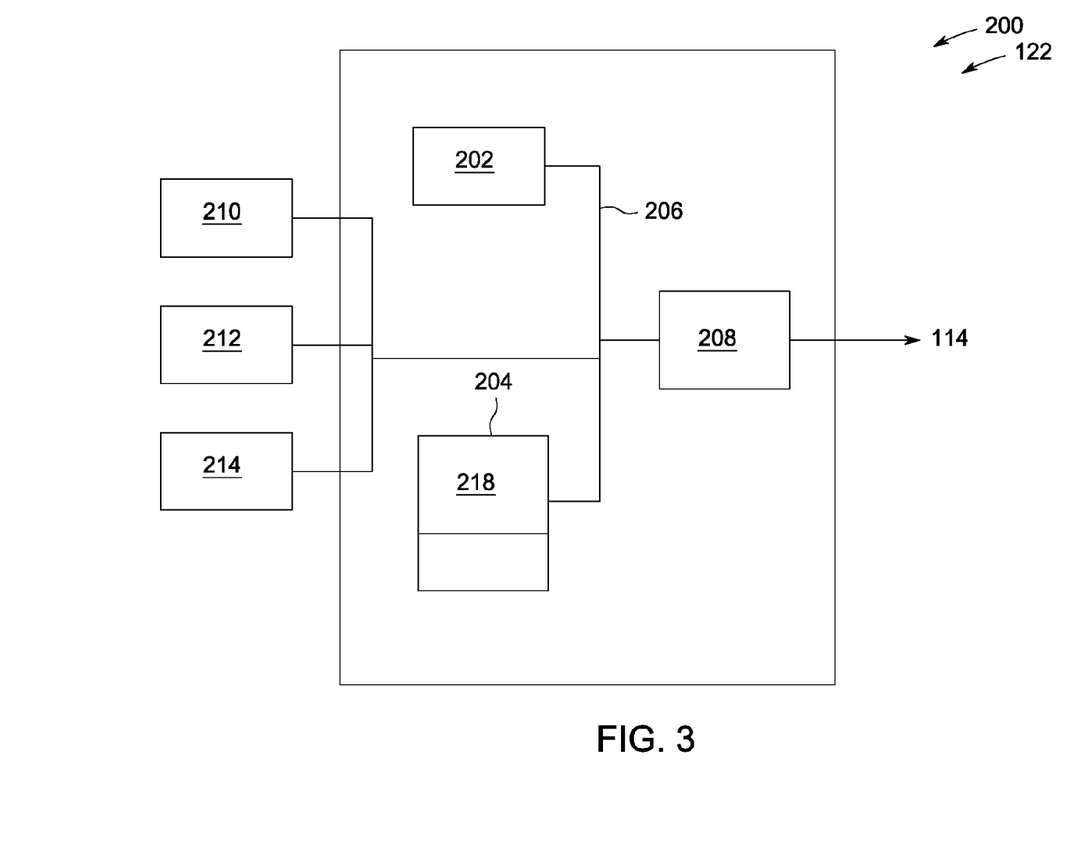
FIG. 3 is a schematic block diagram of an exemplary electrical architecture that may be incorporated into a shared memory device that may be used with the power system shown in FIG. 1.

FIG. 3 is a schematic block diagram of an exemplary electrical architecture 200 that may be incorporated into shared memory device 122. In the exemplary embodiment, shared memory device 122 includes a processor 202 and a memory area 204 interconnected via a bus 206. In an alternative embodiment, each shared memory device 122 includes multiple processors 202. Moreover, in another alternative embodiment, each shared memory device 122 includes a plurality of memory areas 204. Processor 202 may be any programmable system including systems and microcontrollers, reduced instruction set circuits (RISC), application specific integrated circuits (ASIC), programmable logic circuits, or any other circuit or processor capable of executing the functions described herein. Memory area 204 stores operation data for each trip unit 134 and/or each circuit breaker 124 (shown in FIG. 2) for use in executing multi-point functions by other trip units 134 and/or circuit breakers 124. Memory area 204 may include one, or more than one, forms of memory. For example, memory area 204 can include random access memory (RAM), which can include non-volatile RAM (NVRAM), magnetic RAM (MRAM), ferroelectric RAM (FeRAM) and other forms of memory. Memory area 204 may also include read only memory (ROM), flash memory and/or Electrically Erasable Programmable Read Only Memory (EEPROM). Any other suitable magnetic, optical and/or semiconductor memory, by itself or in combination with other forms of memory, may be included in memory area 112. Memory area 204 may also be, or include, a detachable or removable memory, including, but not limited to, a suitable cartridge, disk, CD ROM, DVD or USB memory.

Shared memory device 122 also includes a communication unit 208 that couples shared memory device 122 to network 114. In some embodiments, shared memory device 122 includes one or more user interfaces coupled to processor 202 and memory 204 via bus 206, including a keyboard 210, a mouse 212, and/or a display device 214. In the exemplary embodiment, a portion of memory area 204 is shared memory 216 that is accessible to each trip unit 134 (shown in FIG. 2) in system 100, as described in more detail below.

Figure 4:
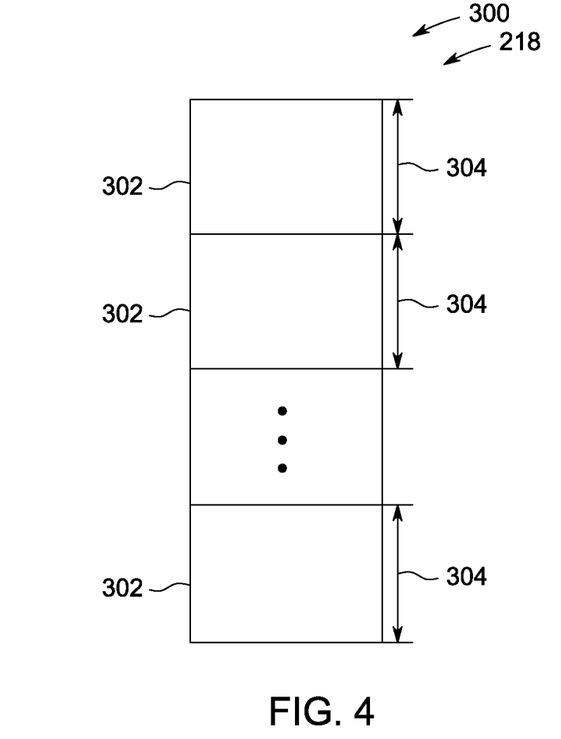
FIG. 4 is a schematic block diagram of an exemplary architecture of shared memory that may be used with the shared memory device shown in FIG. 3.

FIG. 4 is a schematic block diagram of an exemplary architecture 300 of shared memory 216 within each shared memory device 122 (shown in FIGS. 1-3). In the exemplary embodiment, shared memory 216 includes a plurality of memory portions 302, wherein each memory portion 302 is associated with a particular trip unit 134 (shown in FIG. 2). More specifically, each trip unit 134 is identified with a unique identifier such as, but not limited to, a network node number, a network address, a machine access control (MAC) address, or any suitable and readable hardware tag. Shared memory 216 stores operation data including a current level through a conductor of a circuit that is monitored by a circuit breaker 124 (shown in FIG. 2), which is associated with each trip unit 134. Moreover, shared memory 216 stores a voltage level across a plurality of conductors of a circuit that is monitored by a circuit breaker 124, which is associated with each trip unit 134. In addition, shared memory 216 stores a breaker status of each circuit breaker 124. In the exemplary embodiment, each trip unit 134 is associated with a specified interval 304. In the exemplary embodiment, interval 304 associated with trip unit 134 is identically sized. In an alternative embodiment, interval 304 for a first trip unit 136 has a different size than interval 304 for a second trip unit 138. In an alternative embodiment, each memory portion 302 is associated with a particular circuit breaker 124.

Figure 5:
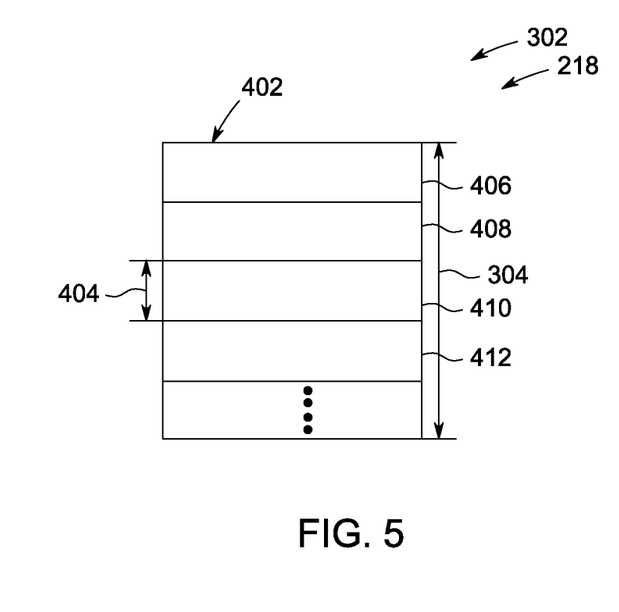
FIG. 5 is a schematic block diagram that further illustrates the architecture shown in FIG. 4.

FIG. 5 is a schematic block diagram that further illustrates architecture 300 of shared memory 216. Specifically, FIG. 5 illustrates memory interval 304 associated with one trip unit 134 (shown in FIG. 2). Each memory interval 304 includes a starting memory address 402 for an associated trip unit 134 that corresponds with the unique identifier for the associated trip unit 134. Moreover, each memory interval 304 includes a plurality of offsets 404 that are each associated with initial configuration values 406, a measured current level 408, a measured voltage level 410, a breaker trip status 412, and any other necessary variables used within system 100.

Figure 6:
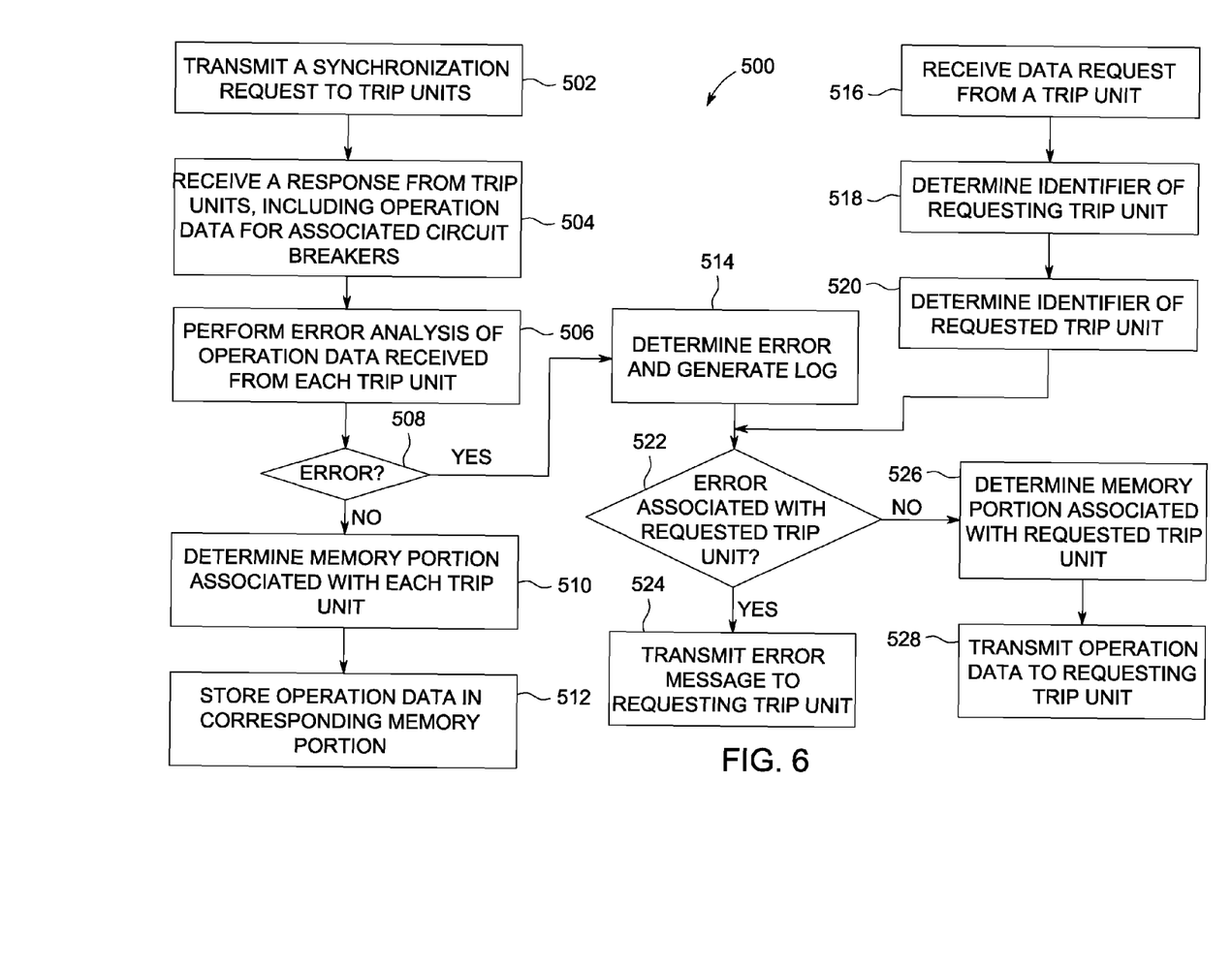
FIG. 6 is a flowchart that illustrates an exemplary method for sharing operation data of a plurality of trip units within the power system shown in FIG. 1.

FIG. 6 is a flowchart 500 that illustrates an exemplary method for storing and/or sharing operation data of a plurality of circuit breakers 124 (shown in FIG. 2) within a power protection system 102 (shown in FIG. 1). In the exemplary embodiment, shared memory device 122 (shown in FIG. 2) transmits 502, such as periodically transmits, a synchronization request message to trip units 134 (shown in FIG. 2). In response to the synchronization request message, each trip unit 134 retrieves operation data from a corresponding circuit breaker 124. For example, first trip unit 136 retrieves the operation data from first circuit breaker 126 (both shown in FIG. 2). In the exemplary embodiment, shared memory device 122 receives 504 a response from each trip unit 134, including the operation data corresponding to circuit breakers 124.

Shared memory device 122 performs 506 an error analysis of response and/or the operation data received from trip units 134, and determines 508 whether the response and/or the operation data received from trip units 134 includes an error message, such as a synchronization failure message or a network timeout message. When no error is detected, shared memory device 122 determines 510 which memory portion 302 (shown in FIG. 4) of shared memory 216 corresponds to each trip unit 134, and stores 512 the operation data received from each trip unit 134. For example, processor 202 (shown in FIG. 3) extracts a unique identifier associated with first trip unit 136 from the response received from first trip unit 136. As noted above, the unique identifier may be a network node number, a network address, a machine access control (MAC) address, or any suitable and readable hardware tag. Based on the unique identifier, processor 202 determines the memory starting address 402 (shown in FIG. 5) of first trip unit 136. Processor 202 stores the operation data received from first trip unit 136 in the corresponding memory portion 302. However, when an error is detected, shared memory device 122 determines 514 the error and generates an error log within memory area 204 (shown in FIG. 3), for example.

In the exemplary embodiment, shared memory device 122 also receives 516 data requests from trip units 134 for use in performing multi-point functions based on operation data of a plurality of circuit breakers 124. Shared memory device 122 determines 518 a unique identifier of the requesting trip unit 134 and determines 520 a unique identifier of the requested trip unit 134. For example, shared memory device 122 receives 516 a data request from first trip unit 136 for use in performing a multi-point function based on operation data related to second trip unit 138. Processor 202 determines 518 a unique identifier of first trip unit 136 by, for example, extracting the unique identifier of first trip unit 136 from the data request. In addition, processor 202 determines 520 a unique identifier of second trip unit 138 by, for example, extracting the unique identifier of second trip unit 138 from the data request.

Shared memory device 122 then determines 522 whether an error was logged as a result of the most recent synchronization request. If an error was logged for the requested trip unit 134, shared memory device 122 transmits 524 an error message to the requesting trip unit 134. In some embodiments, the requesting trip unit 134 then stops execution of any multi-point function that uses operation data related to the requested trip unit 134. For example, processor 202 searches, such as parses, the error log in memory area 204 for the unique identifier of second trip unit 138. If processor 202 determines 522 that an error was logged relating to synchronization of second trip unit 138, processor 202 transmits 524 an error message to first trip unit 136. In some embodiments, first trip unit 136 stops execution of any multi-point function that uses operation data related to second trip unit 138. In the exemplary embodiment, and if shared memory device 122 determines 522 that no errors were logged relating to the requested trip unit 134, shared memory device 122 determines 526 which memory portion 302 of shared memory 216 corresponds to the requested trip unit 134, and transmits 528 the stored operation data to the requesting trip unit 134. For example, processor 202 determines 526 the memory starting address 402 of second trip unit 138 and transmits 528 the operation data stored for second trip unit 138 to first trip unit 136.

Exemplary embodiments of systems, methods, and apparatus are described above in detail. The systems, methods, and apparatus are not limited to the specific embodiments described herein but, rather, operations of the methods and/or components of the system and/or apparatus may be utilized independently and separately from other operations and/or components described herein. Further, the described operations and/or components may also be defined in, or used in combination with, other systems, methods, and/or apparatus, and are not limited to practice with only the systems, methods, and storage media as described herein.

A controller, such as those described herein, includes at least one processor or processing unit and a system memory. The controller typically has at least some form of computer readable media. By way of example and not limitation, computer readable media include computer storage media and communication media. Computer storage media include volatile and nonvolatile, removable and non-removable media implemented in any method or technology for storage of information such as computer readable instructions, data structures, program modules, or other data. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Combinations of any of the above are also included within the scope of computer readable media.

Although the present invention is described in connection with an exemplary power distribution and protection system environment, embodiments of the invention are operation with numerous other general purpose or special purpose power distribution and protection system environments or configurations. The power distribution and protection system environment is not intended to suggest any limitation as to the scope of use or functionality of any aspect of the invention. Moreover, the power distribution and protection system environment should not be interpreted as having any dependency or requirement relating to any one or combination of components illustrated in the exemplary operating environment.

Embodiments of the invention may be described in the general context of computer-executable instructions, such as program components or modules, executed by one or more computers or other devices. Aspects of the invention may be implemented with any number and organization of components or modules. For example, aspects of the invention are not limited to the specific computer-executable instructions or the specific components or modules illustrated in the figures and described herein. Alternative embodiments of the invention may include different computer-executable instructions or components having more or less functionality than illustrated and described herein.

The order of execution or performance of the operations in the embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

When introducing elements of aspects of the invention or embodiments thereof, the articles "a," "an," "the," and "said" are intended to mean that there are one or more of the elements. The terms "comprising," including," and "having" are intended to be inclusive and mean that there may be additional elements other than the listed elements.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method comprising:
receiving, by a shared memory device communicatively coupled to a first trip unit and a second trip unit of a plurality of trip units, a data request from the first trip unit for operation data associated with the second trip unit, each trip unit configured to collect operation data relating to a respective circuit breaker, wherein the shared memory device includes a memory area;
locating the operation data associated with the second trip unit of the plurality of trip units in the memory area; and
transmitting, from the memory area of the shared memory device, the operation data associated with the second trip unit to the first trip unit for use in a multi-point function performed by the first trip unit based on operation data relating to a plurality of circuit breakers.

2. A method in accordance with claim 1, further comprising extracting a unique identifier of the second trip unit from the data request.

3. A method in accordance with claim 2, wherein locating the operation data associated with the second trip unit comprises identifying a memory portion in the memory area according to the identifier of the second trip unit.

4. A method in accordance with claim 1, wherein transmitting the operation data to the first trip unit comprises extracting a unique identifier of the first trip unit from the data request.

5. A method in accordance with claim 1, further comprising:
transmitting a synchronization request to at least the second trip unit of the plurality of trip units; and
receiving a response from at least the second trip unit, the response including the operation data.

6. A method in accordance with claim 5, further comprising performing an error analysis on the operation data received from the second trip unit.

7. A method in accordance with claim 6, further comprising transmitting an error notification to the first trip unit when an error is detected in the operation data received from the second trip unit.

8. A method in accordance with claim 5, further comprising:
- extracting a unique identifier of the second trip unit from the response received from the second trip unit;
- locating a memory portion in the memory area associated with the second trip unit according to the identifier; and
- storing the operation data in the memory location.

9. A power equipment protection system comprising:
- a plurality of trip units comprising at least a first trip unit and a second trip unit, each of said plurality of trip units configured to monitor operation data relating to a respective circuit breaker; and
- a shared memory device communicatively coupled to said plurality of trip units via a network, said shared memory device configured to:
  - transmit a synchronization request to at least said second trip unit;
  - receive a response from said second trip unit, the response including operation data associated with a circuit breaker that is communicatively coupled to said second trip unit;
  - receive a data request from said first trip unit for operation data associated with said second trip unit; and
  - transmit the operation data associated with said second trip unit from said shared memory device to said first trip unit via said network.

10. A system in accordance with claim 9, wherein said shared memory device comprises a memory area and is further configured to:
- extract a unique identifier of said second trip unit from the response received from said second trip unit;
- locate a memory portion in said memory area associated with said second trip unit according to the identifier; and
- store the operation data in said memory location.

11. A system in accordance with claim 9, wherein said shared memory device is further configured to perform an error analysis on the operation data received from said second trip unit.

12. A system in accordance with claim 11, wherein said shared memory device is further configured to transmit an error notification to said first trip unit when an error is detected in the operation data.

13. A system in accordance with claim 12, wherein said first trip unit is configured to execute at least one function using the operation data associated with said second trip unit.

14. A system in accordance with claim 13, wherein said first trip unit is configured to stop execution of the at least one function that uses the operation data as an input in response to the error notification.

15. A system in accordance with claim 9, wherein said shared memory device is further configured to:
- extract a unique identifier of said second trip unit from the data request received from said first trip unit;
- identify a memory portion in said memory area according to the identifier of said second trip unit; and
- locate the operation data associated with said second trip unit for transmission to said first trip unit in response to the data request.

16. A shared memory device for use with a power equipment protection system, said shared memory device coupled to at least a first trip unit and a second trip unit of a plurality of trip units, said shared memory device comprising:
- a memory area configured to store operation data associated with at least the first trip unit; and
- a processor coupled to said memory area and configured to:
  - receive operation data from the first trip unit via a network;
  - store the operation data in said memory area; and
  - transmit the operation data from said memory area of said shared memory device via the network to the second trip unit.

17. A shared memory device in accordance with claim 16, wherein said processor is further configured to transmit a synchronization request to the first trip unit via the network and to receive a message from the first trip unit in response to the synchronization request, wherein the message includes the operation data.

18. A shared memory device in accordance with claim 17, wherein said processor is further configured to extract a unique identifier of the first trip unit from the message and to store the operation data in said memory area according to a memory map that associates the identifier of the first trip unit with a memory portion within said memory area.

19. A shared memory device in accordance with claim 16, wherein said processor is further configured to receive a data request from the second trip unit and to transmit the operation data to the second trip unit in response to the data request.

20. A shared memory device in accordance with claim 19, wherein said processor is further configured to extract a unique identifier of the first trip unit from the data request and to locate the operation data associated with the first trip unit within said memory portion according to the identifier.

* * * * *